Dec. 18, 1928.

H. A. REESE 1,695,346

SMOKELESS RECEPTACLE

Filed June 21, 1927

Inventor
HENRY AUGUST REESE.
By His Attorney
D. Anthony Usina

Patented Dec. 18, 1928.

1,695,346

UNITED STATES PATENT OFFICE.

HENRY AUGUST REESE, OF GLENDALE, NEW YORK, ASSIGNOR OF ONE-HALF TO EVAN S. WEBSTER, OF LONG ISLAND, NEW YORK.

SMOKELESS RECEPTACLE.

Application filed June 21, 1927. Serial No. 200,312.

My invention aims to provide a receptacle for cigarette butts and the like which shall be substantially smokeless and odorless and shall have other advantages referred to hereinafter. The accompanying drawings illustrate an embodiment of the invention.

Figure 1:
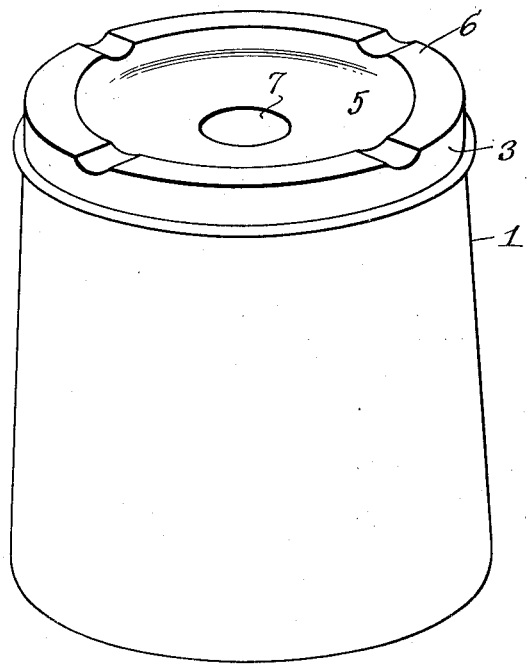
Figure 2:
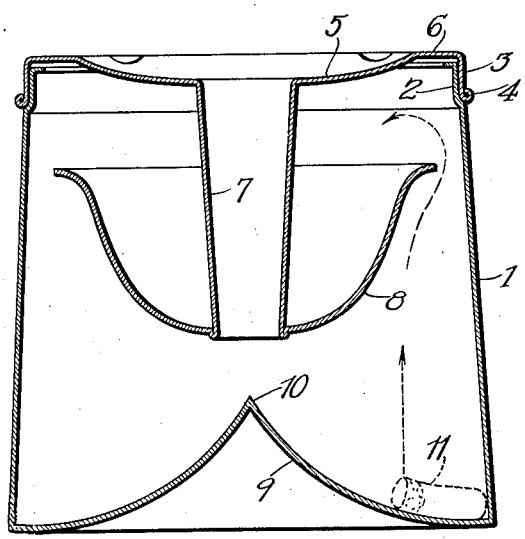

Fig. 1 is a perspective view; and
Fig. 2 is a central vertical section.

The receptacle is circular in cross-section with a side wall 1 sloping slightly inward toward the top with an inwardly offset portion 2 upon which fits the flange 3 of the cover having a beaded edge 4 engaging the shoulder on the side of the vessel. The cover has a central dished portion 5 surrounded by a flat rim 6 with grooves for cigarettes, cigars and so forth.

The cover is open at the center and has a tube 7 leading downward therefrom to a considerable distance. At the lower edge of this tube is a trap formed by a flange 8 extending outward and upward to a considerable height so as to hold a quantity of smoke. The bottom 9 of the receptacle is elevated to a point 10 located in line with the tube 7 and a distance below sufficient to allow butts of cigars and cigarettes to pass freely out of the tube. They are then deflected by the steeply sloping face of the bottom. The latter extends continuously to the upright side 1 and joins the latter at its lower edge.

A cigarette butt dropping through the tube will strike the point 10 and be deflected to the position indicated at 11, generally against or close to the side wall. The hot smoke and odors will rise in the direction of the arrow and be guided by the flange 8 outward over the edge of the latter. As it cools and tends to fall, it will be caught in the trap 8 and cannot again pass out through the tube. The inclination of the wall 1 allows sufficient width at the base for the butts to find positions quite remote laterally from the line of the tube; the convergence of the wall 1 upward serving to narrow the space between it and the edge of the trap 8 so as to hinder any return downward of the smoke and smell accumulating in the trap and the space above it. If the vessel be turned upside down, the shape of the flange 8 would also serve the purpose of deflecting any solid material outward so that no matter how the vessel is handled, there will be no return of smoke or smells or solid things through the tube.

The making of the tube and trap in one piece with the cover permits the easy cleaning of the receptacle. The cover fits frictionally so as to make a substantially tight joint, but one which is easily opened.

Various modifications in the design and proportions of the different parts may be made by those skilled in the art without departing from the invention as defined in the following claims.

What I claim is:—

1. A receptacle of the character described having a cover, a tube leading downward therefrom and a flange within the receptacle engaging said tube and extending upward and outward therefrom.

2. A receptacle of the character described having a cover, a tube leading downward therefrom and a flange within the receptacle extending upward and outward from said tube, the sides of the receptacle sloping inwardly so as to deflect any rising smoke and odors laterally into the trap formed by said flange.

3. A receptacle of the character described having a cover with an opening, a flange around said opening within the receptacle extending upward and outward and sides shaped to deflect any rising smoke and odors laterally into the trap formed by said flange.

4. A receptacle of the character described having a removable cover forming a tray to which is fixed a tube leading downward and a flange extending upward and outward from said tube for preventing escape of smoke and odors.

5. A receptacle of the character described having a cover, a tube leading downward therefrom, a flange extending outward from said tube nearly to the side of the receptacle and a bottom which is elevated at a point below and in line with the bottom of said tube and sloping downward continuously to the upright side of the vessel so as to deflect articles fully to the side.

In witness whereof, I have hereunto signed my name.

HENRY AUGUST REESE.